US006216957B1

(12) United States Patent
Turunen, Jr.

(10) Patent No.: US 6,216,957 B1
(45) Date of Patent: Apr. 17, 2001

(54) HEATED FLOOR SYSTEM FOR A MOVABLE STRUCTURE

(76) Inventor: Roger Turunen, Jr., Rt. 1 Box 329 Bellaire Rd., Baraga, MI (US) 49908

( * ) Notice: Subject to any disclaimer, the term of this patent is extended or adjusted under 35 U.S.C. 154(b) by 0 days.

(21) Appl. No.: 09/260,965

(22) Filed: Mar. 2, 1999

(51) Int. Cl.[7] .................................................. F24D 5/10
(52) U.S. Cl. .................................................. 237/69; 165/50
(58) Field of Search ................................. 237/69; 165/50, 165/53, 56

(56) References Cited

U.S. PATENT DOCUMENTS

| 174,801 | * | 3/1876 | Gill ..................................... 126/271.1 |
| 3,246,689 | | 4/1966 | Remde et al. . |
| 3,970,141 | * | 7/1976 | Raether ............................. 126/271.1 |
| 4,146,221 | | 3/1979 | Newquist et al. . |
| 4,646,815 | * | 3/1987 | Iwata et al. ............................. 165/56 |
| 5,236,063 | | 8/1993 | Nelson et al. . |
| 6,024,291 | * | 2/2000 | Locke .............................. 237/12.3 R |

FOREIGN PATENT DOCUMENTS

831596 * 7/1949 (DE) ...................................... 237/69

* cited by examiner

*Primary Examiner*—Harold Joyce
*Assistant Examiner*—Derek S. Boles
(74) *Attorney, Agent, or Firm*—Andrus, Sceales, Starke & Sawall, LLP

(57) ABSTRACT

A heating system for an enclosed container or structure having a floor includes a tank underlying substantially the entire surface area of the floor and defining an internal cavity. A fluid inlet and a fluid outlet are interconnected with the tank and with a heater via inlet and outlet lines. The heater is located exteriorly of the structure, and provides heated fluid to the tank inlet which is circulated through the internal cavity of the tank and is discharged through the fluid outlet of the tank. Heat from the tank dissipates through the floor and into the interior of the container or structure. The structure may be in the form of a container for storing supplies such as petroleum products which are to be maintained above a certain temperature to provide proper viscosity, or the structure may be in the form of a hunting blind or ice fishing shanty. The tank is pitched such that the fluid inlet is at an elevation higher than that of the fluid outlet. Circulation of fluid from the heater to the tank and from the tank to the heater is by gravity, which eliminates the need for a pumping arrangement. A fuel tank is interconnected with the heater, and may either be disposed in the interior of the structure of exteriorly of the structure. An insulating layer is located beneath the tank to prevent heat from dissipating from the tank other than through the floor of the structure.

25 Claims, 3 Drawing Sheets

HEATED FLOOR SYSTEM FOR A MOVABLE STRUCTURE

BACKGROUND AND SUMMARY OF THE INVENTION

This invention relates to a hot water floor heating system for use in connection with a movable structure exposed to cold weather. More particularly, the invention is directed to a gravity-operated hot water circulation heating system for use in outdoor storage cabinets, hunting blinds, ice shanties and the like.

Hot water heating systems have long been used to heat structures during periods of cold weather. Such systems generally include a heating element, a water reservoir exposed to the heating element, a pump and a piping or conduit system which extends through the structure for circulating hot water from the reservoir through the structure and back to the reservoir. Systems of this type generally include a radiator or the like located within each space of the structure to be heated. All of the components of the system are permanently mounted within the structure and require a significant amount of time and effort to install.

In non-permanent or movable structures, it is known to provide a space heater for heating the interior of the structure. This type of heating arrangement is common in movable structures such as hunting blinds or ice fishing shacks. Heaters of this type take up space within the interior of the structure and provide uneven heat, in that the amount of heat provided to areas remote from the heater is less than that provided to areas closer to the heater. Further, this type of heating arrangement provides little heat to the lower area of the interior adjacent the floor, since heat discharged from the heater tends to rise. Structures of the this type are typically used in cold weather, and it is thus common for occupants to experience uncomfortably cold feet.

The same general difficulties are encountered in movable structures which are not intended for occupation by humans, such as cabinets which are located at a construction site or on a vehicle for storing supplies which require heat. Depending on the nature of the items contained within the structure, it may not be possible to locate a heater within the interior of the structure. For example, some types of heaters cannot be located within the interior of a structure housing petroleum products, due to the flammability of such products.

Further, when a gas-fired heater is used, it is necessary to vent the heater to the outside of the structure in order to prevent buildup of combustion fumes in the interior of the structure.

It is an object of the present invention to provide a heating system for a movable structure in which the heating element is located outside the interior of the structure, so as to eliminate the need to vent the heater and to make available the interior space which otherwise would be occupied by the heating element and its associated venting. A further object of the invention is to provide such a system which distributes heat evenly throughout the interior of the structure. Yet another object of the invention is to provide such a system in which heat is supplied to the lower areas of the structure adjacent the floor. A still further object of the invention is to provide such a system which is relatively simple in its components and construction, yet which provides highly satisfactory heat distribution and operation.

In accordance the present invention, a structure includes one or more walls and a floor which cooperates to define an interior, and a heating arrangement is associated with the floor. The heating arrangement includes an internal cavity which underlies the floor and which contains a quantity of fluid, and a heater located exteriorly of the structure. A circulating arrangement is interconnected between the internal cavity and the heating arrangement for circulating fluid from the heater to the internal cavity and from the internal cavity to the heater. The circulating arrangement is preferably in the form of a fluid inlet associated with the internal cavity for receiving heated fluid from the heater, and a fluid outlet associated with the internal cavity for supplying return fluid to the heater from the internal cavity. Heated fluid from the inlet circulates through the internal cavity toward the outlet, and heat from the fluid is dissipated through the floor for heating the interior of the structure. The internal cavity may be defined by a substantially flat tank underlying the floor, and the tank may be constructed and configured so as to underlie substantially the entire surface area of the floor. The tank preferably includes an upper wall over which the floor is located, and one or more side walls depending from the upper wall. The fluid inlet and the fluid outlet are preferably interconnected with one of the tank side walls. The tank is preferably oriented at an angle to horizontal such that the fluid inlet is located at an elevation above that of the fluid outlet, to enable fluid to flow by gravity from the inlet to the outlet. The heater is preferably in the form of a gravity-type heater interconnected with the fluid outlet for receiving return fluid therefrom and interconnected with the fluid inlet for supplying heated fluid thereto. A removable and replaceable fuel tank is adapted for interconnection with the heater, and may either be located within the interior of the structure or exteriorly of the structure. An insulating layer preferably underlies the tank for preventing heat from dissipating from the tank other than through the floor. The structure may either be adapted for storage of items or for occupation by humans, such as a hunting blind or an ice fishing shack.

In accordance with another aspect of the invention, a heated floor arrangement adapted for use with a structure includes a heater having an inlet port and an outlet port, and a container or tank including a heat-conductive floor having an upper surface spaced from a lower surface. An inlet valve and an outlet valve are connected to the container and communicate with the space between the upper and lower surfaces of the heat-conductive floor. Tubing is interconnected between the outlet valve and the inlet port of the heater and between the inlet valve and the outlet port of the heater, for circulating fluid to the container from the heater and from the container to the heater. The heat-conductive floor defines a point of lowermost elevation located adjacent the outlet valve, and the inlet valve is positioned at an elevation above that of the outlet valve. The heat-conductive floor slants downwardly from the location of the inlet valve toward the location of the outlet valve, for circulating fluid by gravity through the container. The heat-conductive floor preferably slopes downwardly in both a first direction from the inlet valve toward the outlet valve, and in a second direction transverse to the first direction toward the outlet valve, to ensure circulation of fluid to the outlet valve from the inlet valve.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
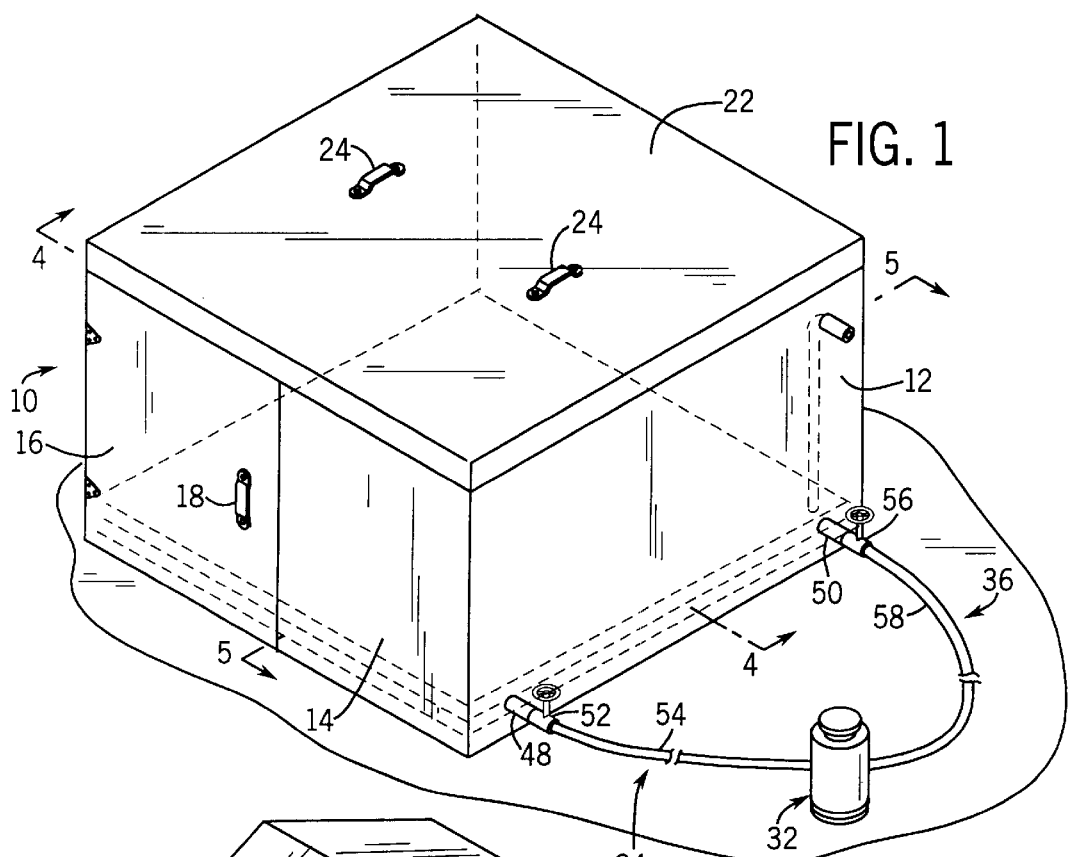
FIG. 1 is an isometric view of a movable storage container incorporating the heated floor system of the present invention.

FIGS. 1 and 4–6 illustrate a first embodiment of the invention, in the form of a cabinet or container 10 which is adapted for use in an outdoor environment. For example, container 10 may be placed at a construction site for housing supplies, such as grease or oil which are to be maintained in a warm environment to provide proper viscosity for use. Alternatively, container 10 may be adapted for mounting onto a vehicle such as a maintenance truck or the like for housing any supplies components desired to be maintained in a warmed environment.

Container 10 generally includes a series of vertical side walls 12, one of which consists of a stationary vertical panel 14 and a hinged door 16 provided with a handle 18. A floor 20 extends between side walls 12 for enclosing the bottom of container 10. A removable top or cover 22 having a pair of handles 24 is adapted for removable engagement with the upper ends of side walls 12. Side walls 12 and floor 20 cooperate to define an interior 26, and cover 22 may be removed using handles 24 to selectively provide access to interior 26. Alternatively, interior 26 can be accessed by opening door 16 with cover 22 in place. Preferably, side walls 12 and cover 22 are formed of a thermally insulating material.

Figure 4:
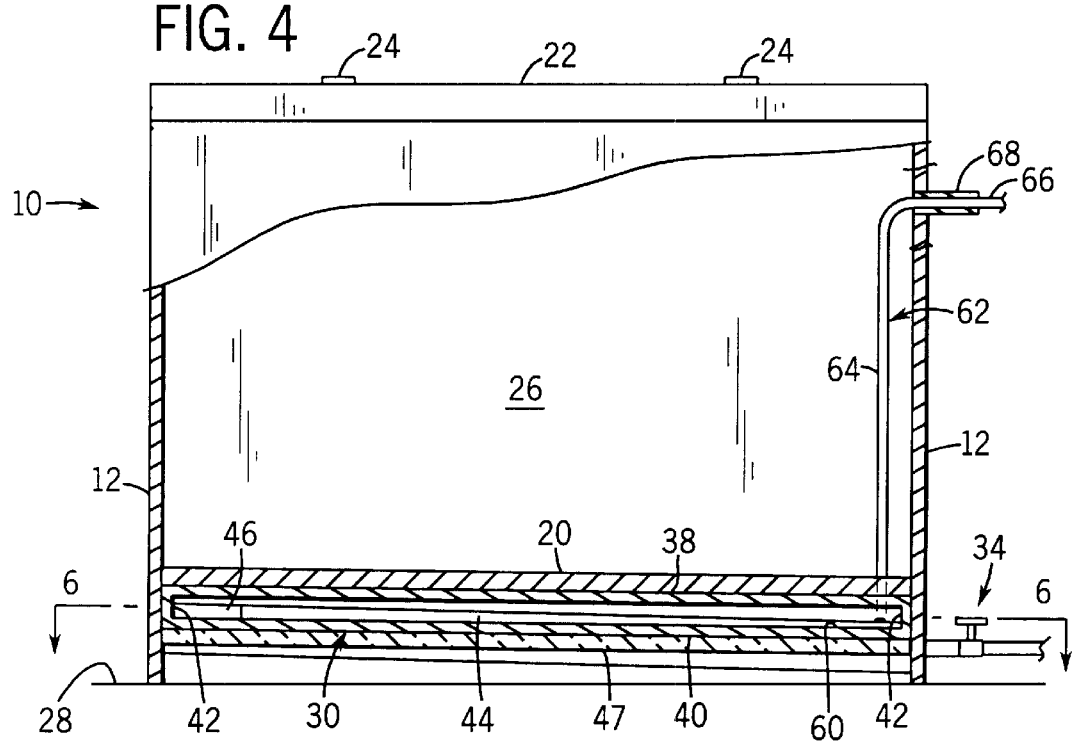
FIG. 4 is a partial section view taken along line 4—4 of FIG. 1.

Referring to FIG. 4, the lower ends of side walls 12 are adapted to engage a supporting surface 28, and floor 20 is located above supporting surface 28, such that a volume is defined between floor 20 and supporting surface 28 bounded by the lower ends of side walls 12.

Container 10 includes a heating arrangement for imparting heat to interior 26, which generally includes a reservoir or tank 30 located below floor 20, a heater 32 (FIG. 1), a supply arrangement 34 interconnected between heater 32 and tank 30 for providing heated water to tank 30, and a return arrangement 36 interconnected between tank 30 and heater 32 for providing return flow of fluid from tank 30 to heater 32.

Figure 6:
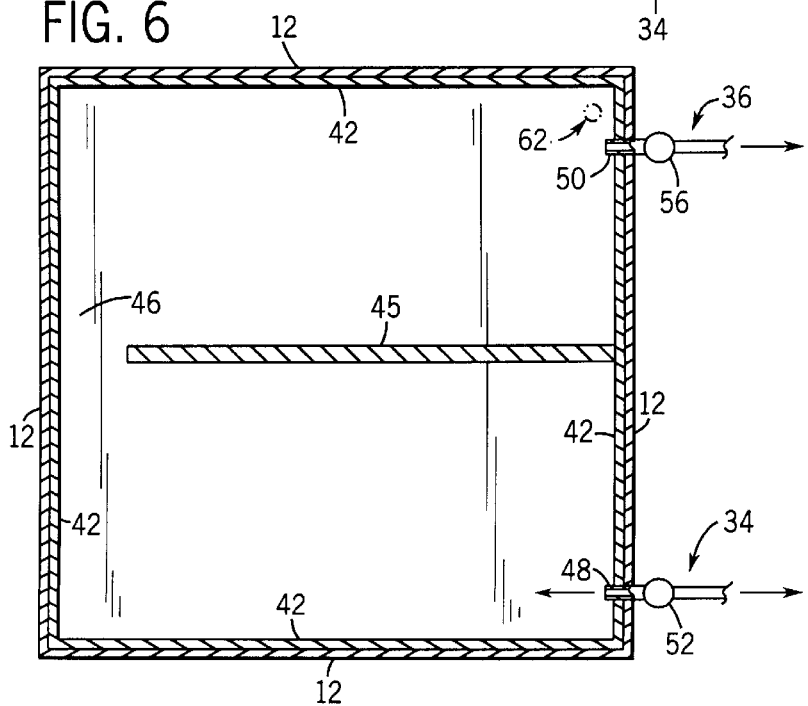
FIG. 6 is a section view taken along line 6—6 of FIG. 4.
Figure 5:
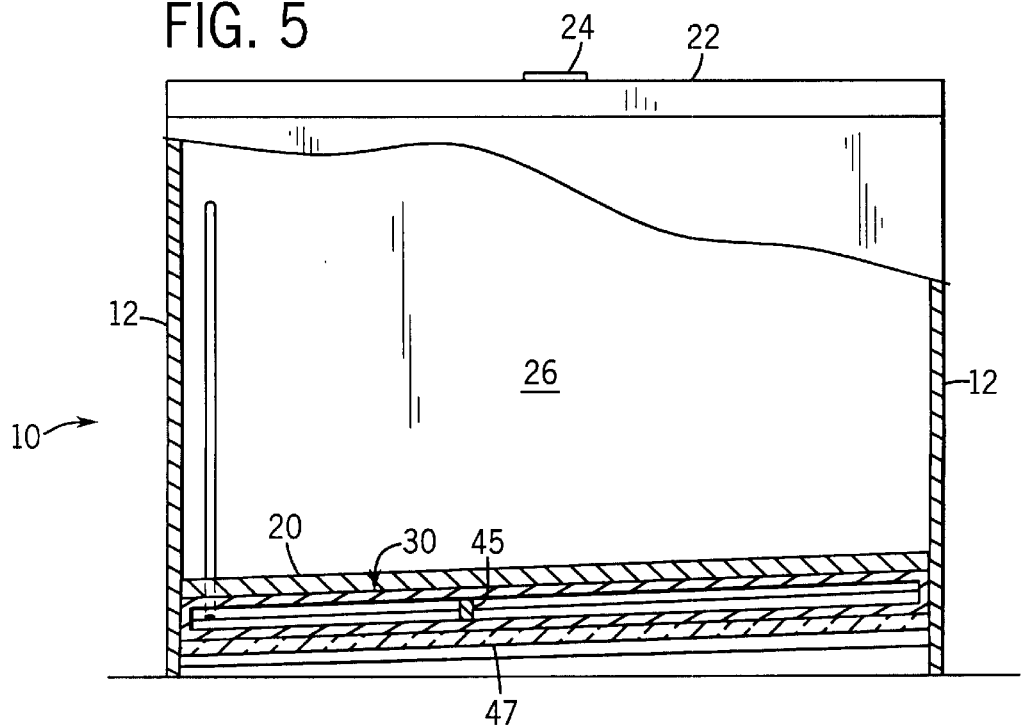
FIG. 5 is a partial section view taken along line 5—5 of FIG. 1.

Referring to FIGS. 4 and 5, tank 30 is generally flat and planar, and has a shape corresponding to that of floor 20 so as to encompass substantially the entire surface are of floor 20. Tank 30 includes a top wall 38, a bottom wall 40 spaced below top wall 38, and a series of side walls 42 which extend between and interconnect top and bottom walls 38, 40, respectively, to define an internal cavity 44. Referring to FIG. 6, a baffle 45 is located within internal cavity 44. Baffle 45 is in the form of a wall extending between tank top and bottom walls 38, 40, respectively. Baffle 45 extends laterally from one of tank side walls 42, and terminates at a location spaced from the opposite wall 42, to define a passage 46.

As shown in FIGS. 4 and 5, a layer of insulation 47 is located below bottom wall 40 of tank 30, encompassing substantially the entire surface area of tank 40 in order to prevent loss of heat through tank bottom wall 40. Floor 20 and tank 30 are in intimate contact with each other, in that the underside of floor 20 engages the upper surface of tank top wall 38.

Referring to FIG. 1, an inlet nipple 48 and an outlet nipple 50 are mounted to the tank side wall 42 from which baffle 45 extends. Inlet nipple 48 forms a part of supply arrangement 34, which also includes an inlet valve 52 mounted to inlet nipple 48 and a supply conduit 54 extending between inlet valve 52 and the outlet of heater 32. Similarly, outlet nipple 50 forms a part of return arrangement 36, which also includes an outlet valve 56 and a conduit 58 interconnected between outlet valve 56 and the inlet of heater 32. Inlet nipple 48 and outlet nipple 50 are located on opposite sides of baffle 45.

Tank 30 is oriented at a compound angle relative to horizontal and relative to side walls 12. The end of tank 30 adjacent inlet nipple 48 is the point of highest elevation of tank 30, and tank 30 is pitched relative to horizontal so as to slope or slant toward outlet nipple 50 from inlet nipple 48. In addition, tank 30 is pitched toward outlet nipple 48 in a transverse direction, i.e. tank 30 slopes or slants toward outlet nipple 50 from the side of tank 30 opposite nipples 48 and 50. In this manner, internal cavity 44 of tank 30 defines a lowermost point 60 adjacent outlet nipple 50.

With reference to FIGS. 4 and 5, a fill/vent tube 62 extends through floor 20 and tank top wall 38, and defines a lower end which opens into tank internal cavity 44 at lowermost point 60. Tube 62 defines a vertical section 64 extending upwardly from the lower end within container interior 26, and a horizontal section 66 which extends through a sleeve 68 mounted to side wall 12. Tube 62 defines an upper opening located outwardly of sleeve 68 for communicating exteriorly of container 10.

Heater 32 may be a conventional outdoor heater, such as that typically used to heat engine blocks. Heater 32 is portable and is typically fired using fuel supplied from a separate fuel tank, such as a propane tank having a fuel line interconnected with a fuel inlet for heater 32.

In operation, heated fluid flows from the outlet of heater 32 through supply conduit 54 and into the internal cavity 44 of tank 30 through inlet valve 52 and inlet nipple 48. The heated water flows into tank 30 and through internal cavity 44, and heat from tank 30 is transmitted through tank top wall 38 and floor 14 into interior 26 of container 10. In this manner, heat is supplied to the entire volume of container interior 26, including the lowermost regions adjacent floor 20. The heated fluid flows from the uppermost point of tank 30 adjacent inlet nipple 48 first into the upper portion of internal cavity 44 above baffle 45. The heated fluid then flows through passage 46 into the lower portion of internal cavity 44 below baffle 45, and circulates through tank internal cavity 44 to lowermost point 60 adjacent outlet nipple 50. By the time the fluid reaches lowermost point 60, a majority of the heat from the fluid has been dissipated through tank top wall 38 and floor 20 into container interior 26, and the cooled fluid is then discharged from tank 30 through outlet nipple 50 and outlet valve 56 into return conduit 58 for supply to the inlet of heater 32. The fluid is then reheated in heater 32 and again supplied through supply conduit 54 to tank 30.

The heating system, consisting of heater 32, tank 30, supply arrangement 34 and return arrangement 36, is a gravity-fed system in which heated water flows by gravity from the outlet of heater 30 toward inlet nipple 50, and by gravity through tank internal cavity 44 from inlet nipple 48 to lowermost point 60 and outlet nipple 50. Fluid from outlet nipple 50 flows by gravity through return conduit 58 to the return inlet of heater 32.

Fill/vent tube 62 is employed to supply additional fluid to the system if necessary, and to provide a vent to prevent the buildup of pressure within tank 30. Valves 52 and 56 are used to disconnect conduits 54 and 58, respectively, when heater 32 is not needed or requires service or replacement.

The heating medium which circulates through tank 30 and heater 32 may be any satisfactory fluid which can be heated, cooled or circulated. Representatively, the medium may be a liquid such as water or a glycol-based antifreeze such as is commonly used in automotive cooling systems, or a combination thereof.

Figure 2:
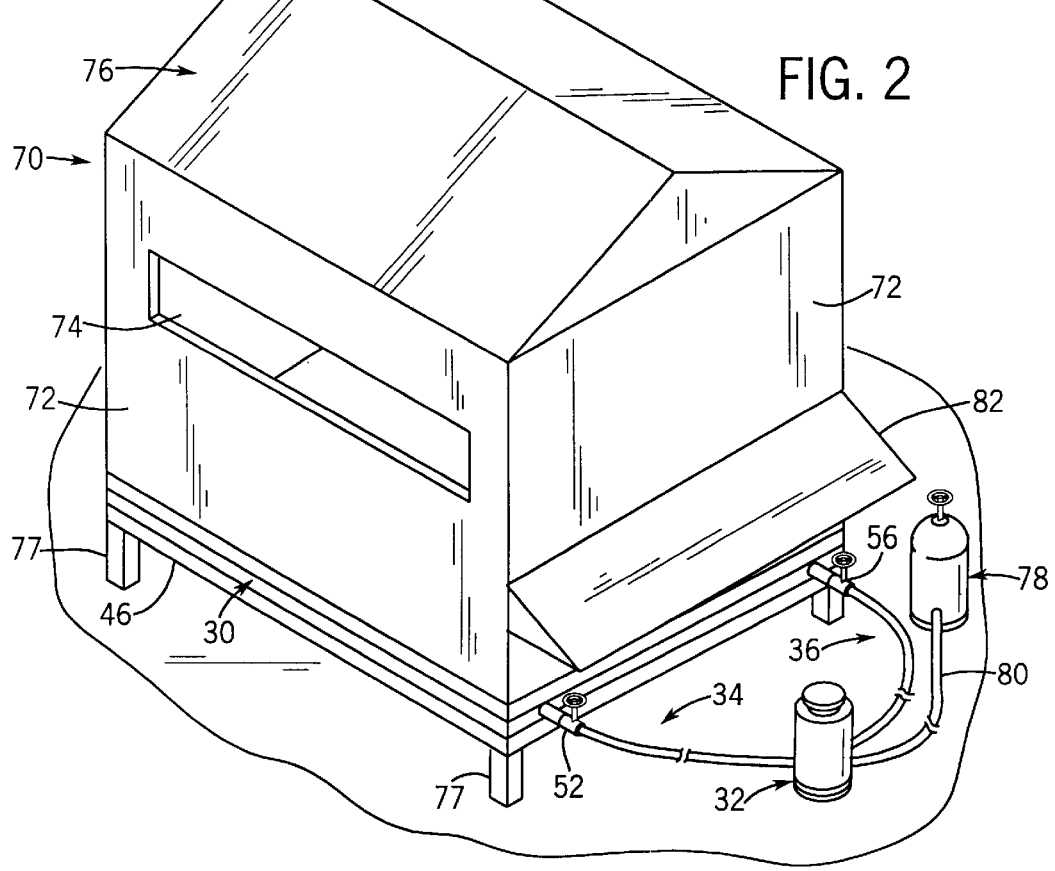
FIG. 2 is an isometric view of a non-permanent structure, in the form of a hunting blind, incorporating the heated floor system of the present invention.

FIG. 2 illustrates an alternative embodiment of the present invention, which may be a structure such as a hunting blind 70, which includes a series of side walls 72 which are generally similar to side walls 12 of container 10, and one of which is provided with a window or opening 74. A roof 76 is fixed to the upper ends of side walls 72 for enclosing an interior defined by hunting blind 70, which is again generally similar to interior 26 defined by container 10.

Hunting blind 70 includes a floor constructed similarly to floor 20 of container 10, and a tank 30 and insulation layer 46 underlying the floor. A series of legs 77 extend downwardly from the corners of tank 30 for spacing the tank 30 and the floor of hunting blind 70 above the ground or other supporting surface. Supply arrangement 32 and return arrangement 34 are interconnected with the tank of hunting blind 70 and with heater 32. FIG. 2 illustrates a fuel tank 78 interconnected with heater 32 through a fuel supply line 80, for supplying fuel to heater 32. An awning 82 is mounted to the side wall 72 of hunting blind 70 over inlet and outlet valves 52, 56, respectively, to protect the valves during transport and from weather.

While fuel tank 78 and fuel supply line 80 are illustrated in FIG. 2, it is understood that a fuel tank and fuel supply line are also provided for the embodiment of FIG. 1, for supplying fuel to heater 32.

With the arrangement of FIG. 2, heat is supplied to the interior of blind 70 in the same manner as described above with respect to container 10.

Figure 3:
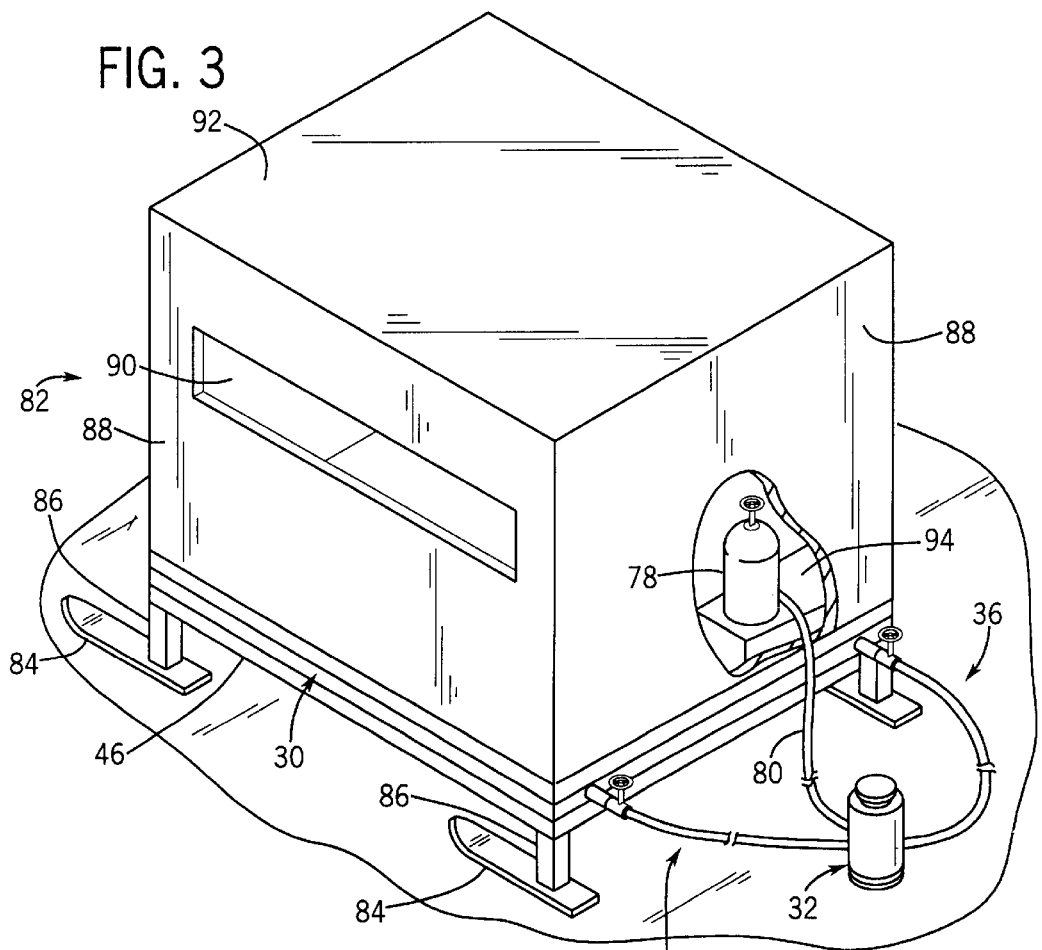
FIG. 3 is an isometric view of a non-permanent structure, in the form of a runnermounted ice fishing shack, incorporating the heated floor system of the present invention.

FIG. 3 illustrates yet another embodiment of the invention, in the form of an ice fishing shack or shanty 82. Shanty 82 is mounted on a set of skis or runners 84 mounted to the lower ends of a set of legs 86, to facilitate movement of shanty 84 over the ground and over ice to a desired location. Shanty 82 includes a series of side walls 88, one of which includes a transparent window 90. A roof 92 is located at the upper ends of side walls 86 for enclosing the interior of shanty 82, which includes a floor similar to floor 20 of container 10. A tank underlies the floor of shanty 82 in the same manner as tank 30 of container 10. In this embodiment, fuel tank 78 may be supported on a shelf 94 located within the interior of shanty 82, with fuel supply line 80 extending outwardly from shanty 82 through an opening formed in one of the side walls 88 for connection to heater 32. Again, heater 32 functions in the same manner as described previously with respect to container 10 for heating the interior of shanty 82.

It can thus be appreciated that the invention provides a simple and efficient means for imparting heat to the interior of a container or other structure, in which heat is supplied even to the lowermost regions of the structure and evenly throughout the entire volume of the structure. The heating system is simple in its components, construction and operation, and provides a simple and safe means for heating supplies or occupants of a structure without the need to vent exhaust fumes from the interior of the structure and without a heating element being located within the interior of the structure.

Various alternatives and embodiments are contemplated as being within the scope of the following claims particularly pointing out and distinctly claiming the subject matter regarded as the invention.

I claim:

1. A heated floor system comprising:

a heater having an inlet port and an outlet port;

a container including a heat-conductive floor having an upper surface spaced from a lower surface;

an inlet valve connected to the container and communicating with the space between the upper and lower surfaces of the heat-conductive floor;

an outlet valve connected to the container and communicating with the space between the upper and lower surfaces of the heat-conductive floor;

tubing connecting the outlet valve with the heater inlet port and connecting the inlet valve with the heater outlet port; and a fuel supply connected to the heater, wherein the fuel supply comprises a refillable fuel tank adapted for removable connection to the heater.

2. The heated floor system of claim 1 wherein the fuel supply tank is located within the container, and further comprising a fuel supply tank hose extending through the container for connecting the fuel tank to the heater.

3. The heated floor system of claim 1 wherein the inlet valve and outlet valve are connected on the same side of the container.

4. The heated floor system of claim 3, wherein the heat conductive floor defines a point of lower-most elevation located adjacent the outlet valve.

5. A heated floor system comprising:

a heater having an inlet port and an outlet port;

a container including a heat-conductive floor having an upper surface spaced from a lower surface;

an inlet valve connected to the container and communicating with the space between the upper and lower surfaces of the heat-conductive floor;

an outlet valve connected to the container and communicating with the space between the upper and lower surfaces of the heat-conductive floor;

tubing connecting the outlet valve with the heater inlet port and connecting the inlet valve with the heater outlet port;

wherein the inlet valve and outlet valve are connected on the same side of the container and wherein the heat conductive floor defines a point of lower-most elevation located adjacent the outlet valve, and wherein the inlet valve is positioned above the outlet valve and the heat-conductive floor slants downwardly from the location of the inlet valve toward the location of outlet valve, and includes a flow-directing baffle for diverting the flow of fluid between the inlet valve and the outlet valve.

6. The heated floor system of claim 5 wherein the heat-conductive floor is further slanted from a container wall opposite the inlet and outlet valves toward the inlet and outlet valves.

7. A heated floor system for an enclosed container comprising:
- a heat-conductive floor having an upper panel spaced a distance from a lower panel;
- a fuel supply tank;
- a heater connected to the fuel supply tank having an inlet port and an outlet port;
- an inlet valve connected to the container and in communication with the space between the upper and lower panels of the heat conductive floor and the outlet port of the heater; and
- an outlet valve connected to the container and in communication with the inlet port and the space between the upper and lower panels of the heat-conductive floor, wherein the heat-conductive floor defines a point of lower-most elevation adjacent the outlet valve;
- wherein the heat-conductive floor slopes downwardly in a first direction from the inlet valve toward the outlet valve.

8. The heated floor system of claim 7 wherein the heat-conductive floor slopes downwardly in a second direction transverse to the first direction toward the outlet valve.

9. The heated floor system of claim 8 further comprising a fuel supply tank hose extending through a wall of the container and connecting the fuel supply tank with the heater.

10. The structure of claim 8, wherein the tank is constructed and configured so as to underlie substantially the entire surface area of the floor.

11. A structure, comprising:
- one or more walls and a floor which cooperate to define an interior; and
- a heating arrangement associated with the floor, comprising an internal cavity underlying the floor for containing a quantity of fluid, a heater located exteriorly of the structure, and a circulating arrangement for circulating fluid from the heater to the internal cavity and from the internal cavity to the heater, wherein the circulating arrangement comprises a fluid inlet associated with the internal cavity for receiving heated fluid from the heater and a fluid outlet associated with the internal cavity for supplying return fluid to the heater from the internal cavity, wherein fluid circulates through the internal cavity from the inlet toward the outlet so as to heat the floor;
- wherein the internal cavity is defined by a substantially flat tank underlying the floor, wherein the tank includes an upper wall over which the floor is disposed, and one or more sidewalls depending from the upper wall, wherein the fluid inlet and the fluid outlet are interconnected with the tank sidewall, and wherein the tank is oriented at an angle to horizontal such that the fluid inlet is located at an elevation above that of the fluid outlet such that fluid flows by gravity from the inlet to the outlet.

12. The structure of claim 11, wherein the tank includes a flow-directing baffle located between the fluid inlet and the fluid outlet for directing the flow of fluid through the internal cavity.

13. The structure of claim 10, wherein the heater comprises a gravity-type heater interconnected with the fluid outlet for receiving return fluid therefrom and interconnected with the fluid inlet for supplying heated fluid thereto.

14. A structure, comprising:
- one or more walls and a floor which cooperate to define an interior;
- a heating arrangement associated with the floor, comprising an internal cavity underlying the floor for containing a quantity of fluid, a heater located exteriorly of the structure, and a circulating arrangement for circulating fluid from the heater to the internal cavity and from the internal cavity to the heater, wherein the circulating arrangement comprises a fluid inlet associated with the internal cavity for receiving heated fluid from the heater and a fluid outlet associated with the internal cavity for supplying return fluid to the heater from the internal cavity, wherein fluid circulates through the internal cavity from the inlet toward the outlet so as to heat the floor;
- wherein the internal cavity is defined by a substantially flat tank underlying the floor and wherein the tank is constructed and configured so as to underlie substantially the entire surface area of the floor;
- wherein the heater comprises a gravity-type heater interconnected with the fluid outlet for receiving return fluid therefrom and interconnected with the fluid inlet for supplying heated fluid thereto; and
- a fuel tank separate from the heater and selectively connected to the heater.

15. The structure of claim 10, further comprising an insulating layer underlying the tank.

16. The structure of claim 10, further comprising a tube interconnected with the tank and extending upwardly therefrom for use in filling the tank.

17. The structure of claim 16, wherein the tube is interconnected with the tank adjacent the fluid outlet.

18. A structure comprising:
- one or more walls and a floor which cooperate to define an interior;
- a heating arrangement associated with the floor, comprising an internal cavity underlying the floor for containing a quantity of fluid, a heater located exteriorly of the structure, and a circulating arrangement for circulating fluid from the heater to the internal cavity and from the internal cavity to the heater, wherein the circulating arrangement comprises a fluid inlet associated with the internal cavity for receiving heated fluid from the heater and a fluid outlet associated with the internal cavity for supplying return fluid to the heater from the internal cavity, wherein fluid circulates through the internal cavity from the inlet toward the outlet so as to heat the floor;
- wherein the internal cavity is defined by a substantially flat tank underlying the body, and wherein the tank is constructed and configured so as to underlie substantially the entire surface area of the floor;
- an insulating layer underlying the tank; and
- a removable cover selectively engageable with upper ends defined by the one or more walls for selectively providing access to the interior.

19. The structure of claim 10, further comprising a roof secured to upper ends defined by the one or more walls for enclosing the interior.

20. A heating system for a structure having a bottom wall and one or more sidewalls which cooperate to define an interior, comprising:
- a cavity underlying the bottom wall and including a fluid inlet located at a first elevation and a fluid outlet located at a second elevation below the first elevation;
- a fluid heater located exteriorly of the cavity; and
- a circulating arrangement including a heated fluid supply line extending from the heater to the fluid inlet of the cavity for supplying heated fluid to the cavity from the heater, and a return line extending from the fluid outlet of the cavity for supplying return fluid to the heater from the cavity, wherein the differential in elevation between the fluid inlet and the fluid outlet is operable to circulate fluid through the cavity from the fluid inlet toward the fluid outlet and from the fluid outlet to the heater.

21. The heating system of claim 20, wherein the bottom wall defines an area enclosed by the one or more sidewalls, and wherein the cavity underlies substantially the entire area defined by the bottom wall.

22. The heating system of claim 21, further comprising a layer of heat insulting material underlying the cavity.

23. The heating system of claim 21, wherein the cavity is defined by a substantially flat, planar tank.

24. The heating system of claim 23, wherein the tank defines one or more sidewalls extending from a top wall.

25. The heating system of claim 24, wherein the fluid inlet and the fluid outlet are interconnected with at least one of the tank's sidewalls.

* * * * *